(12) United States Patent
Kumata (10) Patent No.: US 10,360,169 B2
(45) Date of Patent: Jul. 23, 2019

(54) ASYNCHRONOUS INTERFACE

(71) Applicant: SONY SEMICONDUCTOR SOLUTIONS CORPORATION, Kanagawa (JP)

(72) Inventor: Ichiro Kumata, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 81 days.

(21) Appl. No.: 15/560,336

(22) PCT Filed: Feb. 19, 2016

(86) PCT No.: PCT/JP2016/054808
§ 371 (c)(1),
(2) Date: Sep. 21, 2017

(87) PCT Pub. No.: WO2016/158063
PCT Pub. Date: Oct. 6, 2016

(65) Prior Publication Data
US 2018/0074991 A1 Mar. 15, 2018

Related U.S. Application Data

(63) Continuation of application No. PCT/JP2016/054808, filed on Feb. 19, 2016.

(30) Foreign Application Priority Data

Mar. 30, 2015 (JP) .................. 2015-069109

(51) Int. Cl.
*G06F 13/42* (2006.01)
*G06F 5/06* (2006.01)
*G06F 13/40* (2006.01)

(52) U.S. Cl.
CPC .......... *G06F 13/4213* (2013.01); *G06F 5/065* (2013.01); *G06F 13/42* (2013.01);
(Continued)

(58) Field of Classification Search
CPC ...... G06F 5/065; G06F 13/42; G06F 13/4213; G06F 2205/067; G06F 2213/0004
See application file for complete search history.

(56) References Cited

U.S. PATENT DOCUMENTS 5,918,055 A * 6/1999 Crawford .................. G06F 9/50
710/1
7,417,993 B1 8/2008 Ebergen et al.
(Continued)

FOREIGN PATENT DOCUMENTS

CN 101213534 A 7/2008
CN 104380273 A 2/2015
(Continued)

OTHER PUBLICATIONS

International Search Report and Written Opinion of PCT Application No. PCT/JP2016/054808, dated Apr. 19, 2016, 06 pages of ISRWO.
(Continued)

*Primary Examiner* — Henry Tsai
*Assistant Examiner* — Christopher Daley
(74) *Attorney, Agent, or Firm* — Chip Law Group (57) ABSTRACT

An asynchronous interface according to the disclosure includes: a transmission circuit that transmits, with data of W bits as one word, the data on the one-word basis, and transmits an REQ signal whose value differs by one bit per transmission of the data of one word; a reception circuit including a reception buffer having a reception buffer word count of n (n is an integer of 4 or more), in which the reception circuit receives the data on the one-word basis, and
(Continued)

transmits an ACK signal whose value differs by one bit per reception of the data of one word; a data signal line that has a bit width of W, and transfers the data from the transmission circuit to the reception circuit; an REQ signal line that has a bit width of $\log_2(n)$ or more, and transfers the REQ signal from the transmission circuit to the reception circuit; and an ACK signal line that has a bit width of $\log_2(n)$ or more, and transfers the ACK signal from the reception circuit to the transmission circuit.

7 Claims, 5 Drawing Sheets

(52) U.S. Cl.
CPC .... *G06F 13/4036* (2013.01); *G06F 2205/067* (2013.01); *G06F 2213/0004* (2013.01)

(56) References Cited

U.S. PATENT DOCUMENTS

| | | | |
|---|---|---|---|
| 7,996,704 B2* | 8/2011 | Chen | G06F 13/4059 710/52 |
| 8,977,812 B1* | 3/2015 | Chen | G06F 3/0608 707/692 |
| 9,690,487 B2* | 6/2017 | Hayasaka | G06F 3/0641 |
| 2003/0101307 A1* | 5/2003 | Gemelli | G06F 17/5045 710/305 |
| 2004/0064096 A1 | 4/2004 | Flaherty et al. | |
| 2006/0259669 A1 | 11/2006 | Dockser et al. | |
| 2014/0064096 A1 | 3/2014 | Stevens et al. | |
| 2015/0124841 A1 | 5/2015 | Zhou et al. | |
| 2015/0317190 A1* | 11/2015 | Ebcioglu | G06F 17/5045 718/106 |

FOREIGN PATENT DOCUMENTS

| | | |
|---|---|---|
| JP | 2011-101390 A | 5/2011 |
| JP | 2015-528223 A | 9/2015 |
| KR | 10-2008-0007506 A | 1/2008 |
| WO | 2013/189009 A1 | 12/2013 |

OTHER PUBLICATIONS

Das, et al., "SAS: Source Asynchronous Signaling Protocol for Asynchronous Handshake Communication Free From Wire Delay Overhead", IEEE 19th International Symposium on Asynchronous Circuits and Systems (ASYNC), May 19-22, 2013, 8 pages.

* cited by examiner

ASYNCHRONOUS INTERFACE

CROSS REFERENCE TO RELATED APPLICATIONS

This application is a U.S. National Phase of International Patent Application No. PCT/JP2016/054808 filed on Feb. 19, 2016, which claims priority benefit of Japanese Patent Application No. JP 2015-069109 filed in the Japan Patent Office on Mar. 30, 2015. Each of the above-referenced applications is hereby incorporated herein by reference in its entirety.

TECHNICAL FIELD

The disclosure relates to an asynchronous interface that utilizes a handshake protocol.

BACKGROUND ART

In performing data transfer between asynchronous blocks that utilize a handshake protocol, a handshake constitutes reciprocating communication for each data transfer. Accordingly, a long transfer distance and a large transfer delay of the handshake result in a decrease in a maximum transfer rate. PTLs 1 and 2, and NPL 1 make proposals for methods of preventing such a decrease in the transfer rate. For example, the following methods are known as the methods of preventing the decrease in the transfer rate.
Method 1. To use a data signal line in a plurality in parallel, in a simple handshake system. For example, to use a configuration described in a lower part of FIG. 1 of NPL 1, in a plurality.
Method 2. To evenly dispose asynchronous FIFOs (First-In First-Out) of a bucket brigade system between the asynchronous blocks (refer to an upper part of FIG. 1 of NPL 1, and PTL 2).
Method 3. To use two FIFOs, to hide a propagation delay of the handshake (refer to FIG. 6 of NPL 1, and PTL 1).

CITATION LIST

Patent Literature

PTL 1: Specification of U.S. Pat. No. 7,417,993
PTL 2: Specification of United States Patent Application Publication No. 2014/0064096

Non Patent Literature

NPL 1: "SAS: Source Asynchronous Signaling Protocol for Asynchronous Handshake Communication Free from Wire Delay Overhead", IEEE Asynchronous Circuits and Systems (ASYNC), 2013 IEEE 19th International Symposium on 19-22 May 2013 (pages 107-114)

SUMMARY OF THE INVENTION

However, the method 1 as mentioned above involves an increase in the number of wirings and circuits, in proportion to the number of the data signal lines in parallel.
The method 2 as mentioned above involves a large number of design man-hours for optimum circuit disposition and wirings in order to keep timing limits. Furthermore, with the number of FIFO stages being small for the transfer distance, a handshake communication distance in each part in the FIFOs becomes longer. This contributes to the decrease in the maximum transfer rate.
The method 3 as mentioned above necessitates two FIFO circuits, causing an increase in the number of circuits. Furthermore, with the two FIFOs being affected by, for example, cosmic rays (a rays) and brought to an inconsistent state between transmission side and reception side, both the transmission side and the reception side are brought to a standby state. Thus, a deadlock state of the handshake occurs, causing possibility that the handshake would not be restored to normal operation. For example, let us assume a case of data transfer of a moving picture. Influences of an error that has occurred on data side are eliminated by periodic updates of image frames. From viewpoint of a user, such an error causes nothing more than an instantaneous distortion of an image. However, an occurrence of a deadlock of a transfer control causes serious conditions such as a stop of the image. In many cases, restoration necessitates resetting of an apparatus or turning on a power supply again.

It is therefore desirable to provide an asynchronous interface that makes it possible to prevent a decrease in a transfer rate.

An asynchronous interface according to an embodiment of the disclosure includes a transmission circuit, a reception circuit, a data signal line, an REQ signal line, and an ACK signal line. The transmission circuit transmits, with data of W bits (W is an integer of 1 or more) as one word, the data on the one-word basis, and transmits an REQ signal a value of which differs by one bit per transmission of the data of one word. The reception circuit includes a reception buffer a reception buffer word count of which is n (n is an integer of 4 or more). The reception circuit receives the data on the one-word basis, and transmits an ACK signal a value of which differs by one bit per reception of the data of one word. The data signal line has a bit width of W, and transfers the data from the transmission circuit to the reception circuit. The REQ signal line has a bit width of $\log_2(n)$ or more, and transfers the REQ signal from the transmission circuit to the reception circuit. The ACK signal line has a bit width of $\log_2(n)$ or more, and transfers the ACK signal from the reception circuit to the transmission circuit.

In the asynchronous interface according to the embodiment of the disclosure, the transmission circuit transmits, with the data of W bits as one word, the data on the one-word basis, and transmits the REQ signal the value of which differs by one bit per transmission of the data of one word. The reception circuit includes the reception buffer the reception buffer word count of which is n. The reception circuit receives the data on the one-word basis, and transmits the ACK signal the value of which differs by one bit per reception of the data of one word.

According to the asynchronous interface of the embodiment of the disclosure, the reception circuit includes the reception buffer that is able to buffer a plurality of words. This provides a configuration that allows for data transfer free from rate-limitation by time involved in a handshake. Hence, it is possible to prevent the decrease in the transfer rate.

It is to be noted that effects of the disclosure are not necessarily limited to the effects described above, and may include any of effects that are described herein.

MODES FOR CARRYING OUT THE INVENTION

In the following, some embodiments of the disclosure are described in detail with reference to the drawings. It is to be noted that description is made in the following order.
1. First Embodiment (FIGS. 1 and 2)
1.1 Configuration
1.2 Operation
1.3 Effects
2. Second Embodiment (FIGS. 3 to 5)
2.1 Configuration
2.2 Operation
2.3 Effects
3. Other Embodiments 1. First Embodiment

[1.1 Configuration]

Figure 1:
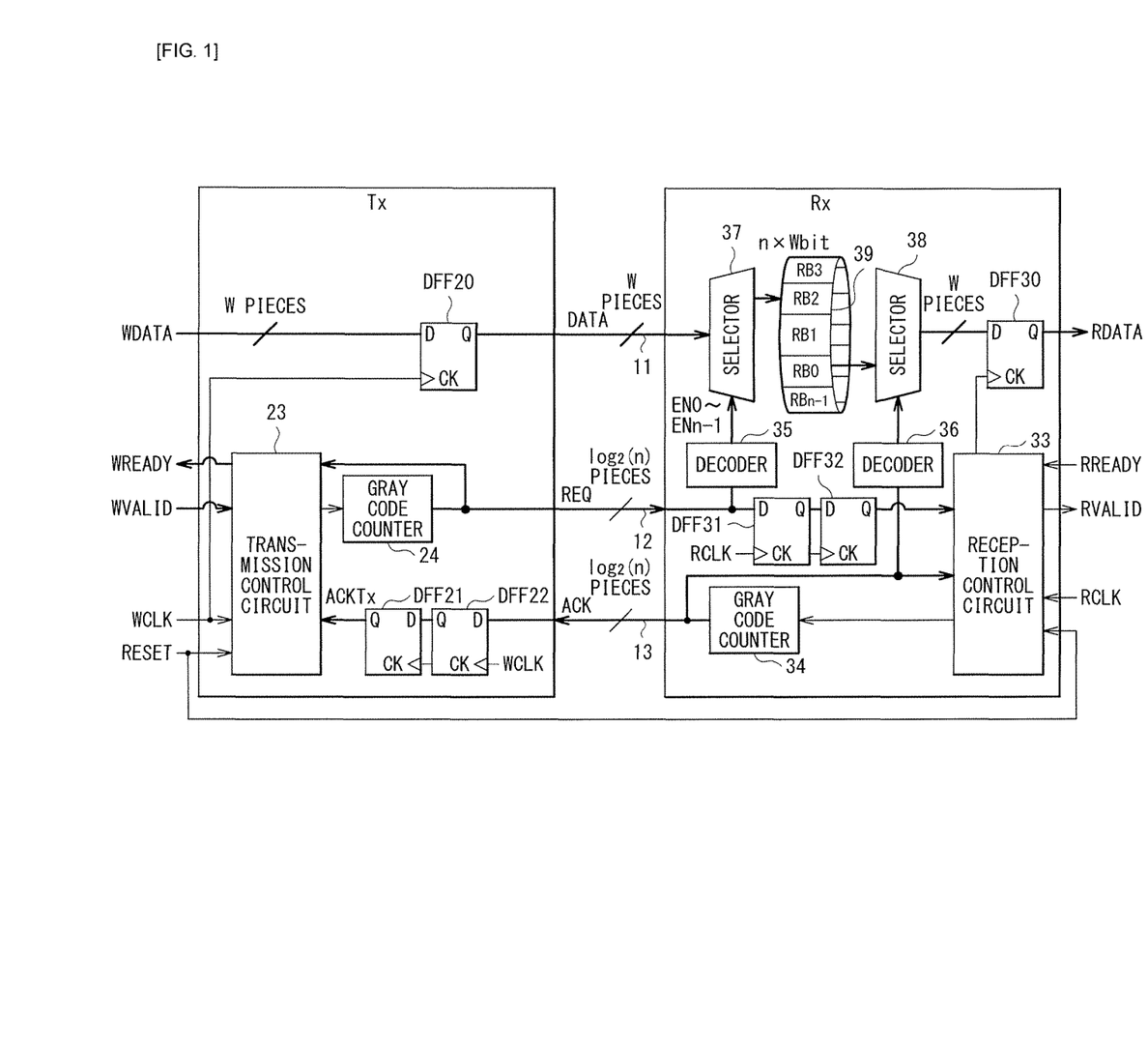
FIG. 1 is a circuit diagram that illustrates one configuration example of an asynchronous interface according to a first embodiment of the disclosure.

FIG. 1 illustrates one configuration example of an asynchronous interface according to a first embodiment of the disclosure. This embodiment relates to an asynchronous interface that transfers data (DATA) by a handshake protocol that utilizes an REQ (request) signal and an ACK (acknowledge) signal.

The asynchronous interface according to this embodiment includes a transmission circuit Tx, a reception circuit Rx, and signal lines that couple them together. The transmission circuit Tx transmits the data. The reception circuit Rx receives the data. The signal lines include a data signal line 11 and handshake lines. The data signal line 11 transfers the data. The handshake lines include an REQ signal line 12 and an ACK signal line 13. The REQ signal line 12 transfers the REQ signal. The ACK signal line 13 transfers the ACK signal.

The transmission circuit Tx receives, from outside, transmission data WDATA and a transmission request signal WVALID, and transmits the data to the reception circuit Rx in accordance with the handshake protocol that utilizes the REQ signal and the ACK signal. The transmission circuit Tx includes a D type flip flop (DFF) 20, a DFF 21, and a DFF 22, a transmission control circuit 23, and a gray code counter 24.

A D terminal of the DFF 20 is supplied with the transmission data WDATA from the outside. The data to be transmitted to the reception circuit Rx is outputted from a Q terminal of the DFF 20. CK terminals of the DFF 20, the DFF 21, and the DFF 22 are supplied with a transmission clock signal WCLK. The ACK signal is inputted to the transmission control circuit 23 through the DFF 21 and the DFF 22.

The transmission control circuit 23 is supplied, from the outside, with the transmission clock signal WCLK, a reset signal RESET, and the transmission request signal WVALID. Moreover, the transmission control circuit 23 outputs a transmission ready signal WREADY to the outside. Furthermore, the transmission control circuit 23 is supplied with the ACK signal as an ACKTx signal, through the DFF 21 and the DFF 22. In addition, the transmission control circuit 23 transmits the REQ signal through the gray code counter 24.

The reception circuit Rx includes a DFF 30, a DFF 31, and a DFF 32, a reception control circuit 33, a gray code counter 34, a decoder 35, a decoder 36, a selector 37, a selector 38, and a reception buffer 39.

A D terminal of the DFF 30 is supplied with data in the reception buffer 39 read through the selector 38. A CK terminal of the DFF 30 is supplied with a clock signal from the reception control circuit 33. The data in the reception buffer 39 is outputted, as reception data RDATA, to the outside, through the selector 38 and the DFF 30.

The reception control circuit 33 is supplied, from the outside, with a reception clock signal RCLK, the reset signal RESET, and a reception ready signal RREADY. Moreover, the reception control circuit 33 outputs a reception request signal RVALID to the outside. Furthermore, the reception control circuit 33 is supplied with the REQ signal through the DFF 31 and the DFF 32. In addition, the transmission control circuit 23 transmits the ACK signal through the gray code counter 24.

The decoder 35 is supplied with the REQ signal. The decoder 35 outputs the REQ signal as write address signals EN to ENn−1 to the selector 37. The selector 37 writes the data to the reception buffer 39, on the basis of the write address signals EN to ENn−1.

The decoder 36 is supplied with the ACK signal. The decoder 36 outputs the ACK signal as a read address signal to the selector 38. The selector 38 reads the data in the reception buffer 39, on the basis of the read address signal.

The transmission circuit Tx transmits, with the data of W bits (W is an integer of 1 or more) as one word, the data on the one-word basis. Moreover, the transmission circuit Tx transmits the REQ signal a value of which differs by one bit per transmission of the data of one word. The transmission circuit Tx transmits, with respect to successive n times of data transmission, the REQ signal n times, with the value of the REQ signal differing each time.

The reception buffer 39 is a buffer a reception buffer word count of which is n (n is an integer of 4 or more) (a buffer the number of buffer stages of which is n). The reception buffer 39 is constituted by, for example, a ring buffer of n×W bits. The reception circuit Rx receives the data on the one-word basis, and transmits the ACK signal a value of which differs by one bit per reception of the data of one word. The reception circuit Rx transmits, with respect to successive n times of data reception, the ACK signal n times, with the value of the ACK signal differing each time.

The data signal line 11 is constituted by W pieces of the signal lines (a bit width is W), and transfers the data from the transmission circuit Tx to the reception circuit Rx.

The REQ signal line 12 is constituted by $\log_2(n)$ or more pieces of the signal lines (the bit width is $\log_2(n)$ or more), and transfers the REQ signal from the transmission circuit Tx to the reception circuit Rx.

The ACK signal line 13 is constituted by $\log_2(n)$ or more pieces of the signal lines (the bit width is $\log_2(n)$ or more), and transfers the ACK signal from the reception circuit Rx to the transmission circuit Tx.

It is to be noted that it is preferable that the reception buffer word count n be a power of 2 and be equal to or larger than 8. It is preferable that the bit width of each of the REQ signal line 12 and the ACK signal line 13 be $\log_2(n)$.

[1.2 Operation]

The asynchronous interface according to this embodiment is suitable for data transfer in a case where, for example, the signal lines are wide-area wirings, causing a propagation delay that is large enough to exceed a clock cycle of the reception circuit Rx or the transmission circuit Tx. For example, the asynchronous interface according to this embodiment is suitable for the data transfer in a case where a sum of signal propagation time in which the REQ signal is propagated through the REQ signal line 12 and signal propagation time in which the ACK signal is propagated through the ACK signal line 13 is larger than a minimum cycle it takes for the transmission circuit Tx to transmit the data, or a minimum cycle it takes for the reception circuit Rx to receive the data.

It is necessary to receive the REQ signal and the ACK signal through, for example, a two-stage shifter of the DFF, for purposes of synchronization, in a case where clocks of the transmission circuit Tx and the reception circuit Rx are asynchronous, or in a case where variations or changes in a clock distribution delay are so large that it is necessary to consider the clocks to be asynchronous. In addition, there is time involved in transmission operation and reception operation between blocks in the transmission circuit Tx and the reception circuit Rx, as well as transfer delays of the REQ signal and the ACK signal. A sum of all these delays constitutes time involved in a handshake for each data transfer of one word.

To restrain a decrease in a transfer rate because of the time involved in the handshake, it is preferable that the reception buffer word count n be so determined as to satisfy the relation $$n \times Tb \geq Ta$$

in which Ta represents time involved in the single handshake, and Tb represents whichever cycle is larger out of a transmission clock cycle of the transmission circuit Tx and a reception clock cycle of the reception circuit Rx.

More specifically, Ta represents time it takes for the transmission circuit Tx to transmit the data of one word and the REQ signal, for the reception circuit Rx to transmit the ACK signal in response thereto, for the transmission circuit Tx to receive the ACK signal, and for the transmission circuit Tx to determine whether or not next data transmission is possible.

Figure 2:
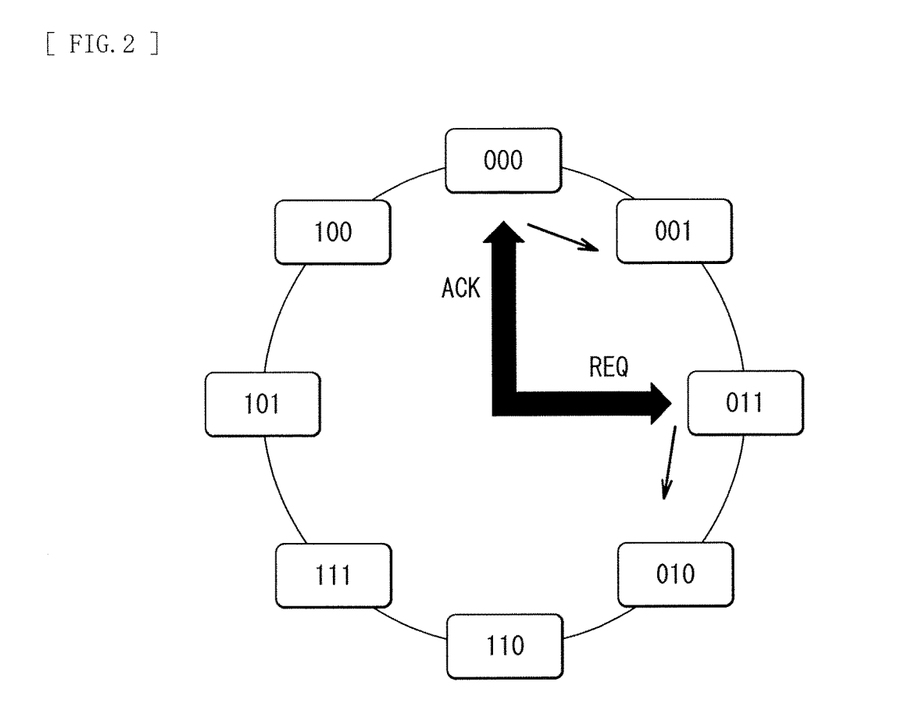
FIG. 2 is a descriptive diagram that illustrates one example of transitions of signal values of an REQ signal and an ACK signal that utilize gray codes.

As an example, with reference to FIG. 2, described is operation in which the REQ signal and the ACK signal are each allowed to differ by one bit each time, utilizing the gray code counters 24 and 34, with the reception buffer word count n=8, and the bit width of the REQ signal line 12=the bit width of the ACK signal line 13=$\log_2(8)$=3 bits.

The gray code counters 24 and 34 output clockwise 3-bit values as illustrated in FIG. 2, for example. The gray code counters 24 and 34 change the REQ signal and the ACK signal solely by one bit per transfer of one word.

With the reset signal RESET being issued, the transmission control circuit 23 and the reception control circuit 33 perform initialization, in the gray code counters 24 and 34, to cause the value of the REQ signal=the value of the ACK signal=000.

In a case where the transmission request signal WVALID is issued and "the next value of the REQ signal≠the value of the ACK signal", the transmission circuit Tx outputs a new piece of the data, and in synchronization therewith, updates the REQ signal to the next value. The reception circuit Rx writes the data to the reception buffer 39 with the utilization of the REQ signal as the address.

In a case where a through latch is utilized for a storage element of the reception buffer 39, it is sufficient to decode the REQ signal by an inverter or a logic gate such as an NAND, and to input a resultant signal as it is to an enable terminal of the through latch. In a case where the DFF is utilized for the storage element of the reception buffer 39, it is also sufficient to decode the REQ signal by the inverter or the logic gate such as the NAND, and to input the resultant signal as it is to a clock terminal. In both cases, because the REQ signal changes by one bit, it is possible to easily design a decoder circuit in which no unnecessary whisker pulses appear in the decoded signal. The whisker pulses cause erroneous operation.

In a case where the reception ready signal RREADY is issued and "the value of the ACK signal≠the value of the REQ signal", the reception circuit Rx outputs the data in the reception buffer 39 as the reception data RDATA to the outside, with the utilization of the ACK signal as the read address. Furthermore, in synchronization therewith, the reception circuit Rx updates the ACK signal to the next value, and thereby notifies transmission-circuit-Tx side of a read completion address.

As described, the reception circuit Rx writes the data received, on the one-word basis, to the reception buffer 39 with the utilization of the REQ signal as the write address, and reads the data in the reception buffer 39, on the one-word basis, with the utilization of the ACK signal as the read address. The transmission circuit Tx notifies, with the REQ signal, the reception circuit Rx of reception timing of the data. The reception circuit Rx writes the data to the reception buffer 39 at the timing of the REQ signal. The reception circuit Rx utilizes the REQ signal and the ACK signal as pointers of the reception buffer 39.

With the operation as described above, even in a case with a delay of the ACK signal from reception-circuit-Rx side, the transmission-circuit-Tx side is able to perform transmission, without waiting for the ACK signal, with regard to the number of vacancies of words ensured in this state in the reception buffer 39.

Now, in general, as a synchronization technique of an asynchronous signal, often used is a shifter by a DFF that utilizes a clock on reception side. With transfer by the DFF being performed with respect to a plurality of bits, there is possibility that the reception side receives, depending on clock timing, a value unintended by the transmission side and makes erroneous operation. For example, in a case where the transmission side changes a signal from 000 to 111, there is possibility that the reception side samples the signal in the course of the change and receives a value such as 010 and 110. However, in this embodiment, because the change is limited to one bit each time, no erroneous operation occurs in a post-stage logic circuit, even in a case where the synchronization of the REQ signal and the ACK signal of a plurality of bits is performed by shift operation of the DFF. Moreover, in writing the data to the reception buffer 39 with the resultant signal from the decoding of the REQ signal on the reception-circuit-Rx side, because the change is made by one bit, it is possible to prevent the erroneous operation even in a case where a write control signal of the data is generated solely by other logic gates than the DFF.

[1.3 Effects]

As described, according to this embodiment, the reception circuit Rx includes the reception buffer 39 that is able to buffer the plurality of the words. This provides the configuration that allows for the data transfer free from rate-limitation by the time involved in the handshake. Hence, it is possible to prevent the decrease in the transfer rate.

In this embodiment, the reception buffer word count is n, and the bit width of each of the REQ signal line 12 and the ACK signal line 13 is $\log_2(n)$ pieces or more. Moreover, the REQ signal and the ACK signal are utilized as the pointers in writing to and reading from the reception buffer 39. Accordingly, comparison of the values of the REQ signal with the ACK signal makes it possible to determine whether or not the next data transfer is possible. Thus, in performing the data transfer between asynchronous blocks, even in a case with long signal transfer time between the blocks, determining the reception buffer word count n so as to satisfy the relation of n× Tb≥Ta as mentioned above makes it possible to perform high-speed data transfer free from the rate-limitation by the time involved in the handshake.

Moreover, according to this embodiment, it is possible to prevent the decrease in the transfer rate, even in the data transfer under a condition that the sum of the signal propagation time in which the REQ signal is propagated through the REQ signal line 12 and the signal propagation time in which the ACK signal is propagated through the ACK signal line 13 is larger than the minimum cycle (a minimum data transmission cycle) it takes for the transmission circuit Tx to transfer the data, or the minimum cycle it takes for the reception circuit Rx to receive the data. Here, let us give a thought to a case where at least the reception circuit Rx is an asynchronous circuit that utilizes no clocks, or where the reception circuit Rx operates at clock cycles sufficiently small with respect to the minimum cycle it takes for the transmission circuit Tx to transfer the data. In such a circuit, no DFF shifter is necessary for synchronization of a handshake signal, or a delay for the synchronization with the utilization of the DFF shifter becomes small with respect to the transmission cycle. With the transfer delays of the REQ signal and the ACK signal being small in such a circuit, there may be a case where the transfer rate is free from the rate-limitation by the time involved in the handshake even in a case with transfer by a simple handshake in which the number of the signal lines of the REQ signal line 12 and the number of the signal lines of the ACK signal line 13 are each one. However, there still occurs the decrease in the transfer rate, in a case with the data transfer under the forgoing condition with the reception circuit Rx being the asynchronous circuit that utilizes no clocks, or in a case with the transfer by the simple handshake with the reception circuit Rx operating at the clock cycles sufficiently small with respect to the minimum data transmission cycle of the transmission circuit Tx. Even in such cases, according to this embodiment, it is possible to prevent the decrease in the transfer rate.

Allowing the bit widths of the REQ signal line 12 and the ACK signal line 13 to be each $\log_2(n)$, and allowing the numbers of the DFFs in a sequential circuit to be $\log_2(n)$ as well make it possible to allow the sequential circuit to be a circuit devoid of an extra state (i.e., a state that is not used in the normal operation). The sequential circuit generates the values of the REQ signal and the ACK signal. Accordingly, in this embodiment, a handshake control is not brought to a deadlock state even in a case of an occurrence of a soft error because of, for example, cosmic rays. This leads to advantages in highly-reliable systems such as medical equipment and space exploration related equipment. Moreover, consumer equipment also enjoys enhanced reliability in a case with large influences of cosmic rays, e.g., uses in aircrafts or uses on a high mountain.

It is to be noted that effects described herein are merely exemplified. Effects of the disclosure are not limited to the effects described herein. Effects of the disclosure may further include other effects than the effects described herein. The same applies to other embodiments in the following.

2. Second Embodiment

Description is given next of a second embodiment of the disclosure. In the following, description is omitted as appropriate regarding parts having similar configurations and workings to those of the forgoing first embodiment.
[2.1 Configuration]

Figure 3:
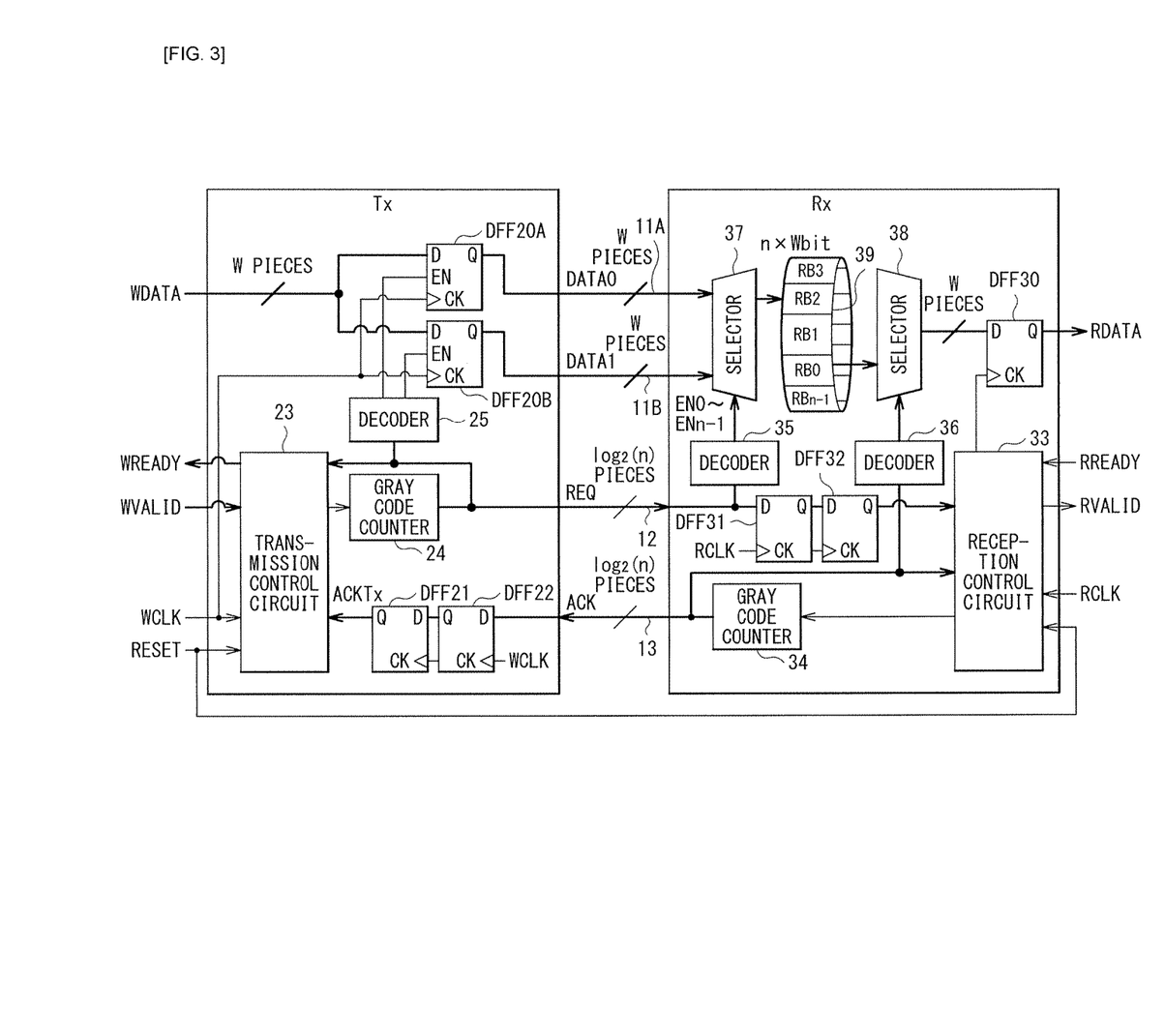
FIG. 3 is a circuit diagram that illustrates one configuration example of an asynchronous interface according to a second embodiment.

FIG. 3 illustrates one configuration example of an asynchronous interface according to a second embodiment of the disclosure.

The asynchronous interface according to this embodiment includes two data signal lines 11A and 11B. Each of the two data signal lines 11A and 11B is constituted by the W pieces of the signal lines (the bit width is W). The two data signal lines 11A and 11B respectively transmit data (DATA0) and data (DATA1).

The transmission circuit Tx includes a DFF 20A and a DFF 20B, instead of the DFF 20 in the configuration in FIG. 1. Moreover, the transmission circuit Tx includes a decoder 25 in addition to the configuration in FIG. 1.

D terminals of the DFF 20A and the DFF 20B are supplied with the transmission data WDATA from the outside. EN terminals of the DFF 20A and the DFF 20B are supplied with a control signal based on the REQ signal, through the decoder 25.

Otherwise, the configuration may be substantially similar to that of FIG. 1.
[2.2 Operation]

Figure 4:
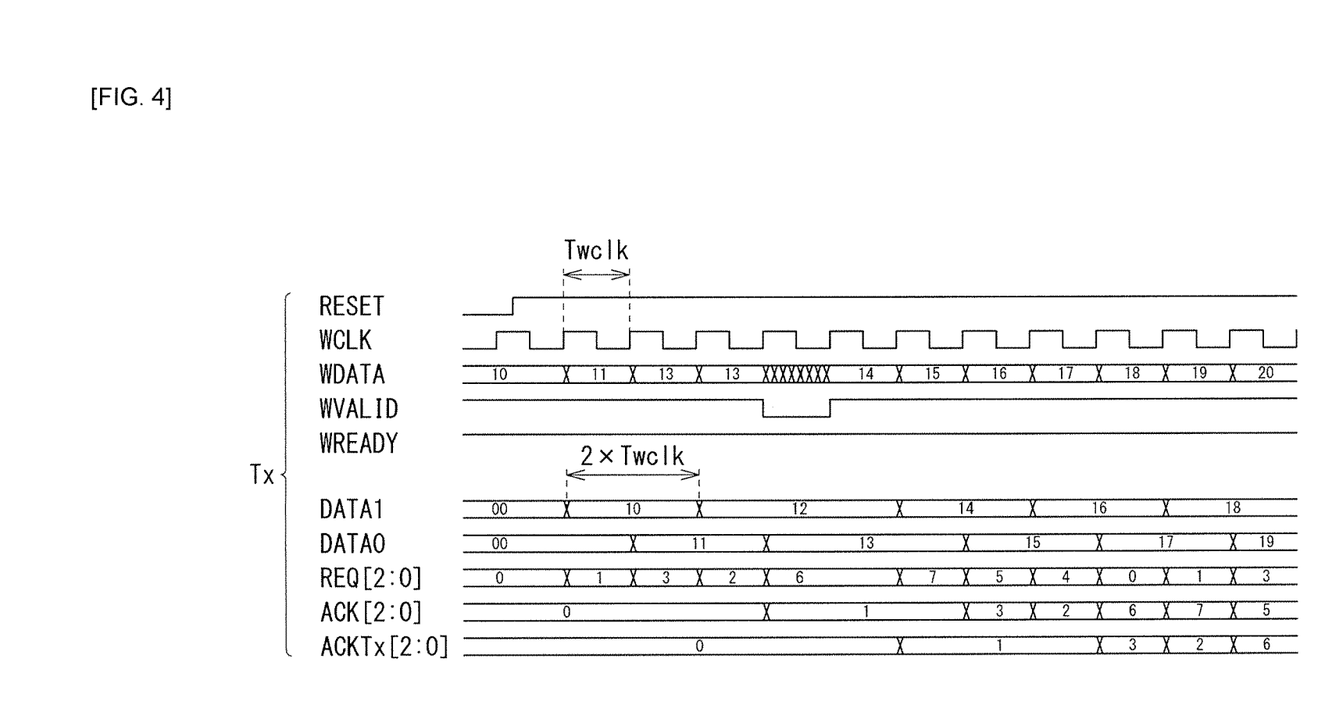
FIG. 4 is a timing chart on transmission-circuit side in the asynchronous interface according to the second embodiment.
Figure 5:
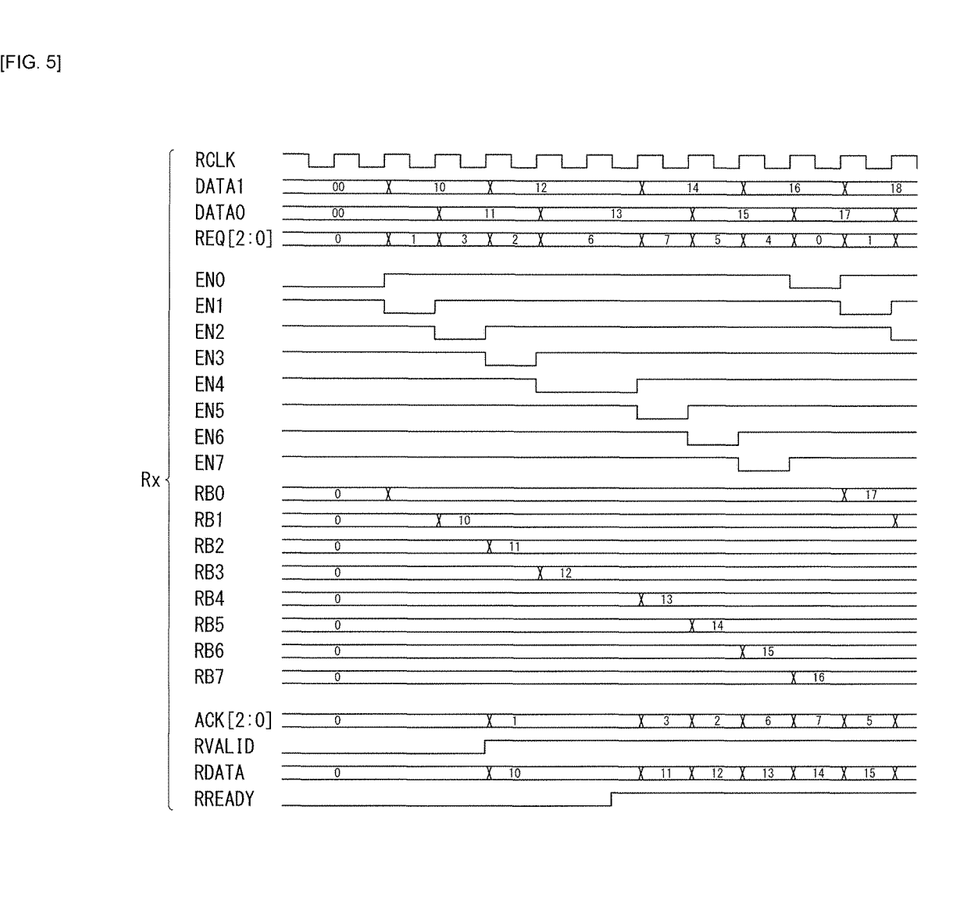
FIG. 5 is a timing chart on reception-circuit side in the asynchronous interface according to the second embodiment.

FIG. 4 illustrates a timing chart on the transmission-circuit-Tx side in this embodiment. FIG. 5 illustrates a timing chart on the reception-circuit-Rx side in this embodiment.

In a case with a high clock frequency, or in a case where variations in the transfer delay are large, and a difference between the transfer delays of the data and the REQ signal causes a failure in receiving the data normally on the reception-circuit-Rx side, the data signal line 11 may be increased in number, so as to ensure an even wider data stabilization period.

In this embodiment, as illustrated in FIGS. 3 and 4, the transmission circuit Tx allocates, on the one-word basis, the data of the plurality of words to the two data signal lines 11A and 11B and transmits the data of the plurality of words, to allow transmission timing to differ from one another. At this occasion, the transmission circuit Tx alternately allocates the data DATA0 and the data DATA1 to the two data signal lines 11A and 11B, in accordance with the value of the REQ signal, and transmits the data DATA0 and the data DATA1. Accordingly, as illustrated in FIG. 3, it is possible to allow the data stabilization period to be Tclk×2, in which Tclk is the clock cycle of the transmission circuit Tx. It is possible to enlarge an allowable delay difference to a clock cycle of about ±Tclk.

It is to be noted that in this embodiment, described is a case with the two data signal lines 11A and 11B (the data signal lines of two systems). However, the data signal lines of three or more systems may be provided. The data may be allocated to the data signal lines of the three or more systems and transferred.

[2.3 Effects]

This embodiment is effective in a case where it is difficult to sufficiently reduce a relative difference between the delays of the data transfer and the transfer of the REQ signal in order to ensure the data reception by the reception circuit Rx. Increasing the data signal line 11 in number, allocating the data in accordance with the value of the REQ signal on the transmission-circuit-Tx side, and latching the data in accordance with the value of the REQ signal on the reception-circuit-Rx side make it possible to increase an allowable range of the relative difference between the delays. Solely adding a logic circuit that decodes the REQ signal and selects a transmission data line allows for such alleviation of timing limits.

3. Other Embodiments

Technology according to the disclosure is not limited to the description of the forgoing example embodiments and may be modified in a variety of ways.

For example, the technology may have the following configuration.

(1)

An asynchronous interface, including:

a transmission circuit that transmits, with data of W bits (W is an integer of 1 or more) as one word, the data on a one-word basis, and transmits an REQ signal a value of which differs by one bit per transmission of the data of one word;

a reception circuit including a reception buffer a reception buffer word count of which is n (n is an integer of 4 or more), the reception circuit receiving the data on the one-word basis, and transmitting an ACK signal a value of which differs by one bit per reception of the data of one word;

a data signal line a bit width of which is W, the data signal line transferring the data from the transmission circuit to the reception circuit;

an REQ signal line a bit width of which is $\log_2(n)$ or more, the REQ signal line transferring the REQ signal from the transmission circuit to the reception circuit; and an ACK signal line a bit width of which is $\log_2(n)$ or more, the ACK signal line transferring the ACK signal from the reception circuit to the transmission circuit.

(2)

The asynchronous interface according to (1), in which the transmission circuit transmits, with respect to successive n times of data transmission, the REQ signal n times, with the value of the REQ signal differing each time, and the reception circuit transmits, with respect to successive n times of data reception, the ACK signal n times, with the value of the ACK signal differing each time.

(3)

The asynchronous interface according to (1) or (2), in which the reception circuit writes the data received, on the one-word basis, to the reception buffer with utilization of the REQ signal as a write address, and reads the data in the reception buffer, on the one-word basis, with utilization of the ACK signal as a read address.

(4)

The asynchronous interface according to any one of (1) to (3), in which a sum of signal propagation time in which the REQ signal is propagated through the REQ signal line and signal propagation time in which the ACK signal is propagated through the ACK signal line is larger than a minimum cycle it takes for the transmission circuit to transmit the data or a minimum cycle it takes for the reception circuit to receive the data.

(5)

The asynchronous interface according to any one of (1) to (4), in which

Ta represents time it takes for the transmission circuit to transmit the data of one word and the REQ signal, for the reception circuit to transmit the ACK signal in response thereto, for the transmission circuit to receive the ACK signal, and for the transmission circuit to determine whether or not next data transmission is possible, Tb represents whichever cycle is larger, out of a transmission clock cycle of the transmission circuit and a reception clock cycle of the reception circuit, and the following relation is satisfied, $$n \times Tb \geq Ta$$

(6)

The asynchronous interface according to any one of (1) to (5), in which the data signal line having the bit width of one word is provided in two or more systems, and the transmission circuit allocates the data of a plurality of words, on the one-word basis, to the data signal lines of the two or more systems, and transmits the data of the plurality of words, to allow transmission timing to differ from one another.

(7)

The asynchronous interface according to any one of (1) to (6), in which the reception buffer word count n is a power of 2 and is equal to or larger than 8, and the bit width of each of the REQ signal line and the ACK signal line is $\log_2(n)$.

This application claims the benefit of Japanese Priority Patent Application JP2015-069109 filed on Mar. 30, 2015, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An asynchronous interface, comprising:

a transmission circuit configured to:

transmit, with data of W bits data on a one-word basis, wherein

W is an integer greater than or equal to 1; and transmit an REQ signal a value of which differs by one bit per transmission of the data of one word;

a reception circuit that comprises a reception buffer, wherein a reception buffer word count of the reception buffer is n, n is an integer of 4 or more, and the reception circuit is configured to:

receive the data on the one-word basis from the transmission circuit, and transmit an ACK signal to the transmission circuit, wherein a value of the ACK signal differs by one bit per reception of the data of one word;

a data signal line configured to transfer the data from the transmission circuit to the reception circuit, wherein a first bit width of the data signal line is W;

an REQ signal line a bit width of which is $\log_2(n)$ or more, the REQ signal line is configured to transfer the REQ signal from the transmission circuit to the reception circuit; and an ACK signal line a bit width of which is $\log_2(n)$ or more, the ACK signal line is configured to transfer the ACK signal from the reception circuit to the transmission circuit.

2. The asynchronous interface according to claim 1, wherein the transmission circuit is further configured to transmit, with respect to successive n times of data transmission, the REQ signal n times, with the value of the REQ signal differing each time, and the reception circuit is further configured to transmit, with respect to successive n times of data reception, the ACK signal n times, with the value of the ACK signal differing each time.

3. The asynchronous interface according to claim 1, wherein the reception circuit is further configured to: write the data received, on the one-word basis, to the reception buffer with utilization of the REQ signal as a write address, and read the data in the reception buffer, on the one-word basis, with utilization of the ACK signal as a read address.

4. The asynchronous interface according to claim 1, wherein a sum of signal propagation time in which the REQ signal is propagated through the REQ signal line and signal propagation time in which the ACK signal is propagated through the ACK signal line is larger than a minimum cycle it takes for the transmission circuit to transmit the data or a minimum cycle it takes for the reception circuit to receive the data.

5. The asynchronous interface according to claim 4, wherein

Ta represents time it takes for the transmission circuit to transmit the data of one word and the REQ signal, for the reception circuit to transmit the ACK signal in response thereto, for the transmission circuit to receive the ACK signal, and for the transmission circuit to determine whether or not next data transmission is possible, Tb represents whichever cycle is larger, out of a transmission clock cycle of the transmission circuit and a reception clock cycle of the reception circuit, and the following relation is satisfied, $$n \times Tb \geq Ta.$$

6. The asynchronous interface according to claim 1, wherein the data signal line having the bit width of one word is provided in two or more systems, and the transmission circuit is further configured to: allocate the data of a plurality of words, on the one-word basis, to data signal lines of the two or more systems, and transmit the data of the plurality of words, to allow transmission timing to differ from one another.

7. The asynchronous interface according to claim 1, wherein the reception buffer word count n is a power of 2 and is equal to or larger than 8, and the bit width of each of the REQ signal line and the ACK signal line is $\log_2(n)$.

* * * * *